United States Patent [19]

Ridenour

[11] Patent Number: 4,881,822
[45] Date of Patent: Nov. 21, 1989

[54] OUTDOOR TEMPERATURE SENSING ASSEMBLY

[76] Inventor: Ralph G. Ridenour, 626 Lexington-Ontario Rd., Mansfield, Ohio 44903

[21] Appl. No.: 175,991

[22] Filed: Mar. 28, 1988

[51] Int. Cl.⁴ ............................................. H05K 5/03
[52] U.S. Cl. .................................. 374/109; 374/208; 174/52.1; 236/91 R
[58] Field of Search ............... 374/208, 163, 109, 29, 374/30, 185, 183; 236/91 R, 91 E, DIG. 12; 136/230; 338/25, 28, 30, 252; 174/52 R; 220/335

[56] References Cited

U.S. PATENT DOCUMENTS

| | | | |
|---|---|---|---|
| 1,081,139 | 12/1913 | Parliman | 374/189 |
| 2,525,361 | 11/1950 | Lamb | 374/138 |
| 2,574,032 | 11/1951 | Hare | 236/91 R |
| 2,583,524 | 1/1952 | Wissmiller et al. | 236/91 E |
| 2,617,598 | 11/1952 | Sanders | 236/91 E |
| 2,705,746 | 4/1955 | Strange | 136/230 |
| 2,959,755 | 11/1960 | Gecsey et al. | 338/28 |
| 3,092,997 | 6/1963 | Gaskill | 374/109 |
| 3,450,862 | 6/1969 | Kralovec, Jr. | 236/91 E |
| 3,512,414 | 5/1970 | Rees | 374/148 |
| 3,650,843 | 3/1972 | Kenyon | 136/217 |
| 3,752,900 | 8/1973 | Harrison et al. | 174/50 |
| 3,901,080 | 8/1975 | Hilborn | 374/147 |
| 3,907,606 | 9/1975 | Chang | 374/179 X |
| 3,955,709 | 5/1976 | Coley et al. | 220/18 |

FOREIGN PATENT DOCUMENTS 622335 9/1977 Fed. Rep. of Germany .... 236/91 R

Primary Examiner—William A. Cuchlinski, Jr.
Assistant Examiner—Hohenshell J. Jeffrey
Attorney, Agent, or Firm—Pearne, Gordon, McCoy & Granger

[57] ABSTRACT

An outdoor temperature sensing assembly includes a temperature sensor such as a thermocouple having a given length mounted inside a thermal mass of low thermal conductivity. This thermal mass is mounted on a mounting plate and shielded by an upper wall, two side walls, and an end wall for free air circulation through the open bottom of the shield yet the shield protects the temperature sensor and thermal mass from sun, wind and rain.

15 Claims, 1 Drawing Sheet

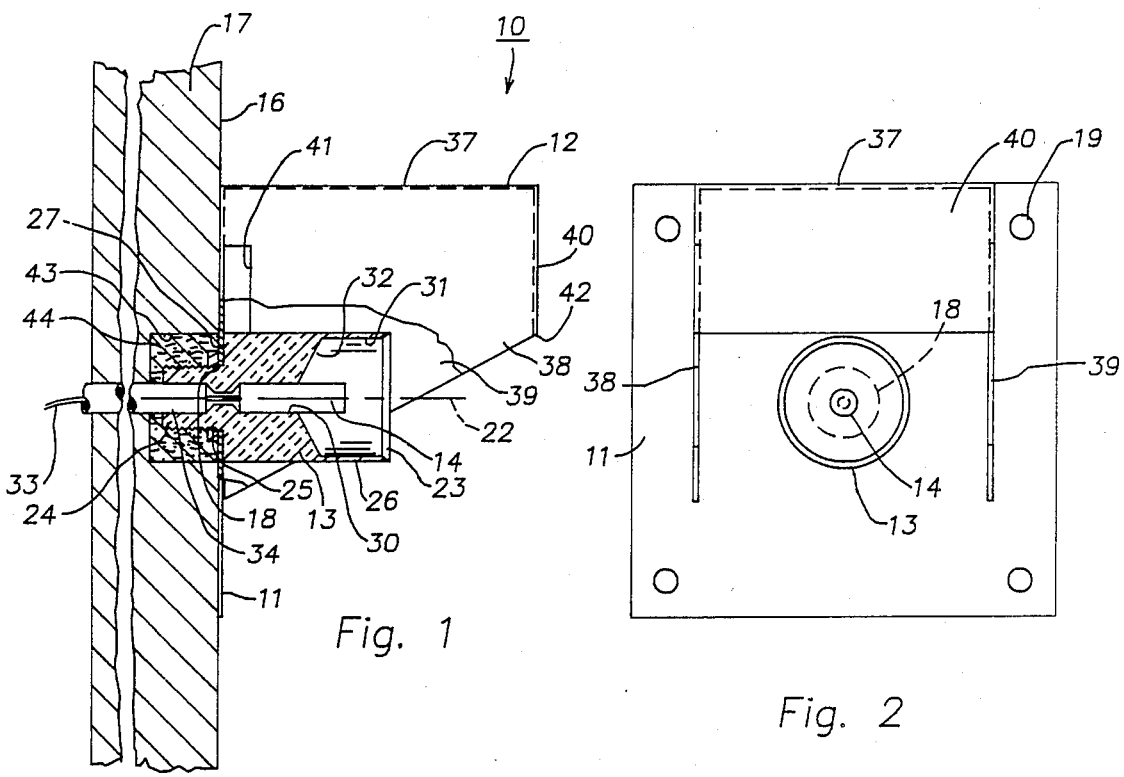
Fig. 1
Fig. 2
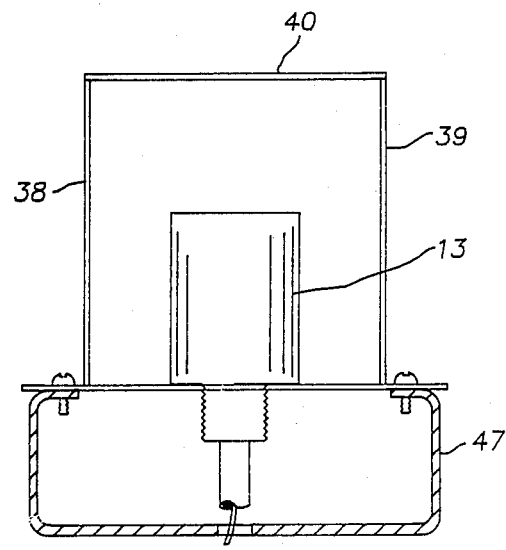
Fig. 3

OUTDOOR TEMPERATURE SENSING ASSEMBLY

BACKGROUND OF THE INVENTION

An outdoor air thermometer has previously been suggested in U.S. Pat. No. 1,081,139 wherein a protective screen is placed over the liquid bulb of the thermometer. U.S. Pat. No. 2,525,361 also suggests an outdoor air thermometer for a small airplane wherein the thermometer is mounted in a rubber plug in an aperture in the aircraft windshield and with the bimetallic thermometer extending forwardly of the aircraft windshield inside a shield. The shield acts as a wind scoop to scoop air in the front end and have it pass out apertures near the rubber plug. U.S. Pat. No. 3,512,414 suggests the use of a temperature sensing element inside an air foil shaped housing for use in the intake air of a turbine engine. Thermocouples have been used to sense high temperatures, for example in U.S. Pat. Nos. 3,650,841; 3,901,080; and 3,907,606. U.S. Pat. No. 3,752,900 suggested a lockable enclosure for an indoor thermostat and U.S. Pat. No. 3,955,709 suggested an outdoor enclosure for electrical apparatus.

SUMMARY OF THE INVENTION

The problem to be solved therefore is how to construct a temperature sensing assembly for use outdoors which will provide a more nearly true reading of the actual outdoor temperature despite varying ambient conditions such as rain, snow, sunshine, sleet, freezing rain and wind. This problem is solved by an outdoor temperature sensing assembly comprising the combination of a mount adapted to be mounted in an outdoor environment, a thermal mass, means securing said thermal mass relative to said mount, a first recess extending into said thermal mass, a temperature sensor mounted in said first recess, a shield mounted on said mount and having wall means establishing an upper wall and side walls, said upper wall lying above said thermal mass and being a closed surface to shield the temperature a sensor from sun, rain and wind and said side walls being disposed laterally of said thermal mass and extending to a level below at least the top of said thermal mass.

A feature of the invention is to provide an outdoor temperature sensing assembly wherein a temperature sensor is shielded from sun, wind and rain yet free air circulation is provided and a thermal mass in proximity to the temperature sensor eliminates rapid temperature fluctuations. This permits the outdoor temperature sensing assembly to be better utilized with heat pumps, air conditioning and heating apparatus inside a building by anticipitating changes in indoor temperature caused by varying outdoor temperatures.

Other objects and a fuller understanding of the invention may be had by referring to the following description and claims, taken in conjunction with the accompanying drawing.

BRIEF DESCRIPTION OF THE DRAWING

FIG. 1 is a side elevational view partly in section of an Outdoor Temperature Sensing Assembly in accordance with the invention;

FIG. 2 is a front view of the assembly of FIG. 1; and

FIG. 3 is a bottom view of the assembly.

DESCRIPTION OF THE PREFERRED EMBODIMENT

The figures in the drawings show an outdoor temperature sensing assembly 10 which includes generally a mount 11, a shield 12, a thermal mass 13 and a temperature sensor 14. The mount 11 is in the form of a flat plate adapted to be mounted in an outdoor environment, for example in a vertical position on the exterior surface 16 of a wall 17 of a building. This mount 11 may be a metal mounting plate with a conductor aperture 18 and securement apertures 19 so that this mounting plate may be secured to the exterior surface of the wall.

The thermal mass 13 is secured relative to the mount 11, and in the preferred embodiment is secured to the mounting plate at the conductor aperture 18. The thermal mass is preferably cylindrical of plastics material such as nylon and has an axis 22. The thermal mass 13 has a first end 23 and a second end 24. The second end 24 is of reduced diameter of pass through the conductor aperture 18 and is threaded to receive a lock nut 25 to secure this thermal mass to the mount 11. The thermal mass has an outer cylindrical surface 26 which is larger than the aperture 18 and therefore this provides a relatively small annular area 27 of the thermal mass in contact with the mounting plate 11. This thermal mass has a first coaxial cylindrical recess 30 extending in from the first end 23 and also has a second larger recess 31 closer to the first end 23 with a 60 degree shoulder 32 between these two recesses. The second recess 31 is also preferably cylindrical and coaxial.

The temperature sensor 14 is preferably a metal cylindrical casing housing a temperature sensor such as a thermocouple. This temperature sensor has a snug fit in the first recess 30 to mount this temperature sensor coaxially in the thermal mass 13. Conductors 33 lead from the temperature sensor 14 through the conductor aperture 18 and through a conduit 34 through the wall 17 to the interior of the building. These conductors are adapted to be connected to a controller for a heating apparatus, air conditioning apparatus or heat pump or the like to control the ambient within the building.

The shield 12 is preferably of metal and preferably integral with the mounting plate 11. The shield provides wall means to shield the thermal mass 13 and temperature sensor 14 from sun, wind and rain. The wall means includes generally an upper wall 37, side wall 38 and 39 and an end wall 40. The upper wall 37 lies above the temperature sensor 14 and thermal mass 13 to shield them from sun, wind and rain. This upper wall is spaced from the thermal mass, as are all of the walls. The two side walls 38 and 39 are spaced laterally on either side of the thermal mass and the lower edges extend at an angle from the mounting plate 11 upwardly to the end wall 40. These two side walls and the end wall provide additional protection to the thermal mass 13 and temperature sensor 14 from sun, wind and rain. The lower edge 42 of the end wall 40 extends below the top of the thermal mass 13 and the lowermost edge of the side walls at the mounting plate 11 extends below the bottom of the thermal mass 13. Each of the side walls 38 and 39 is provided with an air circulation aperture 41 between the top and bottom of the respective side wall and adjacent the mounting plate. The metal walls of the shield 13 may be of any suitable metal such as aluminum and finished in a light neutral color. The threaded second end 24 of the thermal mass 13 extends into an enlarged aperture 43 in the wall 17 and preferably this aperture is filled with a packing 44 to make a seal against air flow between the exterior and the interior of the building.

The outdoor temperature sensing assembly 10 is capable of accurately determining the outdoor temperature despite the many adverse and changing weather conditions such as sun, wind, rain, freezing rain, hail, snow, dust and the like. Rain and especially freezing rain, if it were to impinge on the temperature sensor 14 or the thermal mass 13 could adversely affect the accuracy of the temperature determination. The shield 12 greatly inhibits adverse affects from these varying climatic conditions yet permits good air circulation around the thermal mass 13 and temperature sensor 14. Air may circulate upwardly into the open bottom of the shield 12 and out through the air circulation apertures 41 in the side walls.

FIG. 3 illustrates that the mount 11 may be secured to a standard electrical box 47, which in turn may be fastened on the exterior surface of a building wall, either as a flush mount or a surface mount.

The bottom edge 42 of the end wall 40 combines with the side walls 38 and 39 to further inhibit sun, rain and snow from striking the thermal mass 13 or the temperature sensor 14. A reference line from the temperature sensor 14 to the bottom edge 42 extends upwardly at a small acute angle above the horizontal, for example about 22, degrees so that with this sensing assembly 10 mounted on the north wall of a building, sun will not strike this temperature sensor 14 even at sunrise or sunset on the longest day. The shield side walls extend downwardly and encompass a majority of the thermal mass 13. A reference line from the temperature sensor 14 to the lower edge of the side walls, at their highest point at the end wall 40, does not extend upwardly above a horizontal line more than 30°, as shown in FIG. 2. This inhibits wind driven rain, sleet or snow from striking the temperature sensor, yet the lower end of the shield 12 is open to the outdoor air environment for good temperature sensing. The temperature sensor 14 is coaxial in the thermal mass 13 and the length of this temperature sensor is within the length of the thermal mass so that the second recess 31 further shields the temperature sensor from the elements. Only about the rear half of the temperature sensor is disposed with a snug fit in the first recess 30 to have the temperature of this thermal mass affecting the temperature of the temperature sensor. Since this thermal mass is one of low thermal conductivity, it is slow to change temperature and this slowness helps make the temperature sensor one which is slow to change. Therefor, if a gust of cold wind should strike the sensing assembly 10, it would not change the temperature until enough cold wind had appreciably cooled the thermal mass 13. This is an advantage to prevent rapid cycling of a heating or cooling unit within the building which relies upon this outdoor temperature sensing assembly as an anticipation control. The shield 12 is made preferably of aluminum and preferably has a light tan coating thereon to be one which absorbs little heat from any sunshine. Also it has only a very small annular area 27 in contact with the thermal mass 13 so that changes of temperature of the shield 12 have only minimal affect on the temperature of the thermal mass 13, and in an area of this thermal mass removed from the temperature sensor 14.

The outdoor temperature sensing assembly 10 accordingly has been found to provide a quite accurate determination of the outdoor temperature so as to provide a relatively slowly changing temperature condition on the conductors 33. This prevents any rapid cycling of heating or cooling apparatus controlled by such temperature sensor 14.

The present invention includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An outdoor temperature sensing assembly comprising in combination:
    a mount adapted to be mounted in an outdoor environment;
    a thermal mass of plastics material;
    means securing said thermal mass relative to said mount;
    a first recess extending into said thermal mass;
    a temperature sensor mounted in said first recess;
    a shield mounted on said mount and having wall means establishing an upper wall and side walls;
    said upper wall lying above said thermal mass and being a closed surface to shield the temperature sensor from sun, rain and wind; and
    said side walls being disposed laterally of said thermal mass, extending downwardly and encompassing a majority of said thermal mass, and with the lower end of said shield being open to the outdoor air environment.

2. An outdoor temperature sensing assembly as set forth in claim 1, wherein said shield is constructed to shield said thermal mass from sun, rain and wind.

3. An outdoor temperature sensing assembly as set forth in claim 1, wherein said temperature sensor has a given length;
    and said length of said temperature sensor lying within said thermal mass.

4. An outdoor temperature sensing assembly as set forth in claim 1, wherein said side walls have lower edges and are spaced from said temperature sensor sufficiently that a line from the outer end of said temperature sensor to a highest point of said lower edge of said side walls does not extend upwardly above a horizontal line more than 30° to inhibit rain striking said temperature sensor.

5. An outdoor temperature sensing assembly as set forth in claim 1, wherein said mount is a mounting plate adapted to be mounted vertically on an exterior wall of a building.

6. An outdoor temperature sensing assembly as set forth in claim 1, including an aperture in said mounting plate; and
    conductive leads from said temperature sensor passing through said mounting plate aperture.

7. An outdoor temperature sensing assembly as set forth in claim 1, wherein said thermal mass is generally cylindrical in form and said temperature sensor lies along the axis of said cylinder.

8. An outdoor temperature sensing assembly as set forth in claim 1, including an end wall in said shield;
    said end wall merging with said side walls and being laterally spaced from said mount.

9. An outdoor temperature sensing assembly as set forth in claim 1, including air circulation apertures in said side walls adjacent said mount; and with the first recess in said thermal mass being directed away from said mount and side wall apertures to enhance air circulation yet inhibit rain from striking said temperature sensor.

10. An outdoor temperature sensing assembly as set forth in claim 1, wherein said thermal mass has a minimal contact with said mount relative to the surface area of said mount.

11. An outdoor temperature sensing assembly as set forth in claim 1, wherein said upper wall is substantially horizontal and said side walls are substantially vertical.

12. An outdoor temperature sensing assembly comprising in combination:
   a mount adapted to be mounted in an outdoor environment;
   a thermal mass;
   means securing said thermal mass relative to said mount;
   a first recess extending into said thermal mass;
   a temperature sensor mounted in said first recess;
   a second recess in said thermal mass larger in cross sectional area than said first recess and surrounding and spaced from said temperature sensor;
   a shield mounted on said mount and having wall means establishing an upper wall and side walls;
   said upper wall lying above said thermal mass and being a closed surface to shield the temperature sensor from sun, rain and wind; and
   said side walls being disposed laterally of said thermal mass and extending to a level below at least the top of said thermal mass.

13. An outdoor temperature sensing assembly as set forth in claim 12, wherein said first and second recesses are substantially cylindrical.

14. An outdoor temperature sensing assembly as set forth in claim 12 wherein said first recess has a size establishing a snug fit with a portion of said temperature sensor.

15. An outdoor temperature sensing assembly, comprising in combination:
   a mount adapted to be mounted in an outdoor environment;
   a thermal mass of plastics material of relatively low heat conductivity;
   means securing said thermal mass relative to said mount;
   a first recess extending into said thermal mass;
   a temperature sensor mounted in said first recess;
   a shield mounted on said mount and having wall means establishing an upper wall and side walls;
   said upper wall lying above said thermal mass and being a closed surface to shield the temperature sensor from sun, rain and wind; and
   said side walls being disposed laterally of said thermal mass and extending to a level below at least the top of said thermal mass.

* * * * *